Figure 1:
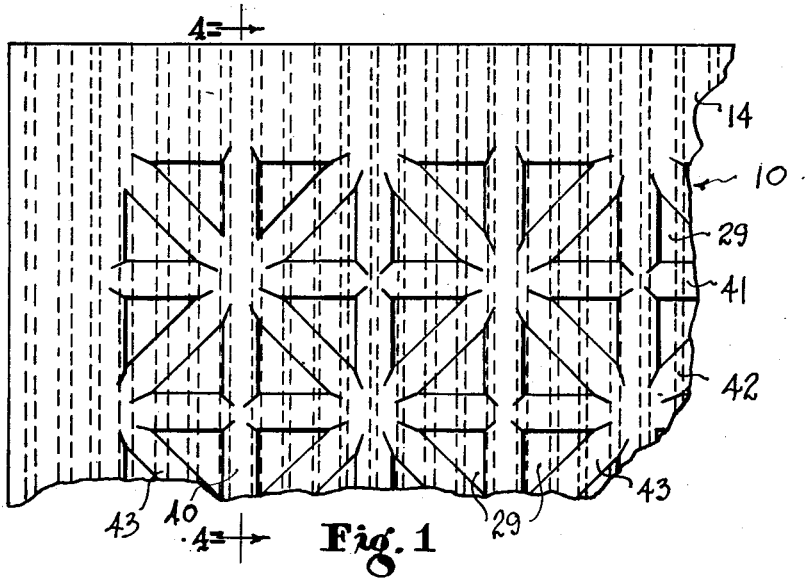

Oct. 23, 1951  J. C. GORDON  2,572,470
GRID AND WAFFLE DESIGN RUG CUSHION
Filed Sept. 15, 1949

INVENTOR.
Jack C. Gordon
BY Daniel G. Cullen
Attorney

Patented Oct. 23, 1951

2,572,470

UNITED STATES PATENT OFFICE 2,572,470

GRID AND WAFFLE DESIGN RUG CUSHION

Jack C. Gordon, Detroit, Mich., assignor to Allen Industries, Inc., Detroit, Mich.

Application September 15, 1949, Serial No. 115,877

1 Claim. (Cl. 41—24)

Be it known that the undersigned has invented certain new and useful improvements in embossed rug cushions of which the following is a specification.

This application relates to embossed rug cushions, and particularly aims to provide embossed, rigid and nonstretchable rug cushions of felt, such as felted jute or hair, and having both surfaces coated with a cured sealing compound, and embossed in a suitable pattern.

The sealing compound may be rubber latex, either natural or synthetic, or any rubber dispersion, either natural or synthetic. One suitable compound is known as "Neoprene." This is a synthetic product made by DuPont Company of Wilmington, Delaware, and described in Patent No. 2,402,837 of June 25, 1946. It is known as chloroprene and is identified by the formula chlore-2-butadiene-1,3. It is a rubber emulsion or dispersion compound with typical accelerators, age retarders, vulcanizing agents and other basic ingredients, fillers, pigments and the like. While the exact composition of the neoprene, which I have successfully used in making the rug cushion hereof, is not known, it is not believed to be material. It is a typical neoprene composition and is obtained under identification of Neoprene 571. For the purposes of this application it may be considered that any suitable sealing compound of the rubber latex, or rubber dispersion class, of which neoprene is an example, may be utilized.

The present invention aims to provide a rug cushion or pad, both of whose surfaces are coated with an above-mentioned sealing compound and embossed and whose edges are beveled.

A further object of this invention is to provide a rug cushion which will possess little or no stretch as compared to the customary rug cushions well known in the art. This advantage is obtained by sealing the cushion on both its surfaces with an above-mentioned sealing compound and, thus, securing the pad or cushion to a permanently sealed and definite dimension.

A further object of the invention is to provide a rug cushion which is readily manageable, easy to manufacture and which can be cut to accurate size, without making any additional allowances for future stretch, as is now customary in the rug cushion industry, thereby saving substantial savings in labor costs, equipment, time and materials necessary to produce these rug cushions.

A further object of the invention is to provide a rug cushion having on both surfaces cured coatings of an above-mentioned sealing compound which are of a character that will not deteriorate or revert to a tacky or sticky stage.

A further object of the invention is to provide a rug cushion having sufficient rigidity to facilitate ease of handling between the seller and the user. The seller may with ease cut small pieces from large rolls and may lay the cushion to the floor without wrinkles or bumps. The rigid coated pad will afford a greater degree of ease in handling than the customary limp and uncoated pad.

A further object of the invention is to provide a rug cushion whose edges are beveled, trimmed and sealed, thus allowing the carpeting on the cushion to fall gradually to the floor and at the same time present a pleasing and improved appearance of the rug along the margin.

A still further object of the present invention is to provide a rug cushion, one of whose faces is embossed with a deeply indented waffle or checkered rib pattern, and the other of whose faces is embossed with a shallow indented corduroy pattern, made up of longitudinal grooves which extend in the direction of the axis of the cylinder into which the rug cushion is normally rolled for storing and handling.

The waffle or checkered rib pattern provides rigidifying ribs extending longitudinally and transversely, and if a waffle pattern, also diagonally, to rigidify the cushion in all directions parallel to its plane, and the grooves of the corduroy pattern facilitate rolling the rug cushion without buckling.

A still further object of the present invention is to provide a rug cushion having differently patterned embossments on opposed faces with the indentations of the patterns being of different depths and arranged to provide longitudinal ribs of maximum thickness which extend parallel to the axis of the cylinder formed by rolling the rug cushion, even though between these longitudinal ribs the rug cushion is thinner because of the embossing and patterning on the opposed faces.

A further object is to provide a rug cushion of felt coated superficially with a rubbery film on both surfaces, the film being of minimum thickness and retaining its rubbery appearance even after first being dried, and then being embossed and cured, with the film impregnating the felt only enough to insure bonding of the film to the felt.

Figure 2:
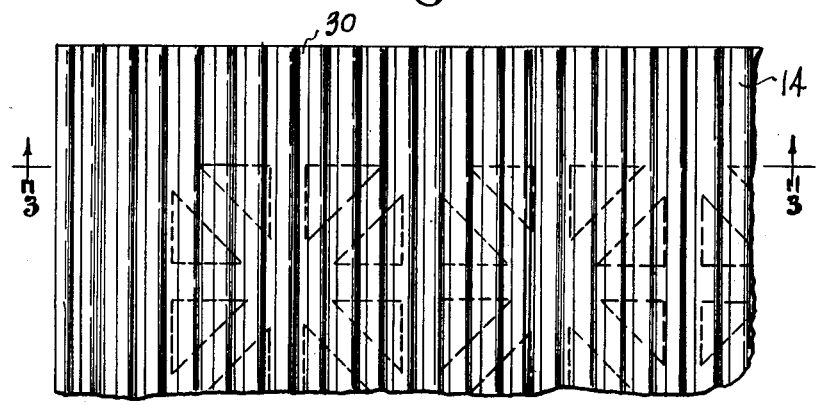
Figure 3:
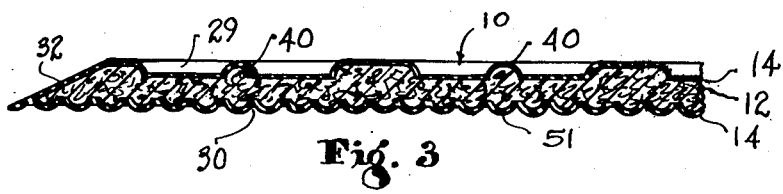
Figure 4:
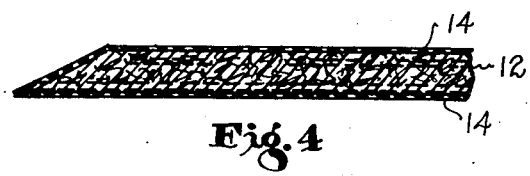

In order to afford an understanding of this invention, it will be described in connection with an illustrative embodiment thereof shown in the accompanying drawing; further purposes, features and advantages of this invention will be apparent from the following description of this invention and of the embodiment thereof shown in the drawing wherein Figs. 1 and 2 are fragmentary plan views of a rug cushion, taken from opposite faces; and Figs. 3 and 4 are relatively transverse section views as if on lines 3—3 and 4—4 of Figs. 1 and 2, showing the patterning and embossment on both faces of the rug cushion.

One preferred embodiment of the invention is shown in Figs. 1-4. The cushion is indicated generally by reference numeral 10 and consists of a base sheet made of felt. The felt will consist of jute or hair or a percentage of jute and hair fibers garnetted and needled to make a felt product of a given density. A form of reinforcement such as tobacco cloth or burlap, not shown, may be used in the center of the felt 12 if a stronger product is desired.

Both faces of the pad are coated, as will later be described, with cured sealing compound coatings whose details and provision will later be described.

As the first step in the manufacture of the rug cushion, the felt base 12 is passed through a dye bath and then to surplus squeezing rollers and a drying oven containing drying rolls. There the felt base is dried and passed on to rolls where the sealing or coating compound is applied to both surfaces.

The coating of the felt sheet can be accomplished by various well known methods. It may be applied by roll coating, as shown, or it could be accomplished by spray coating, or a combination of the two methods could be used. In any event, after the felt sheet has passed through the drying oven, its surfaces are coated with a coating compound.

It is pointed out here that the coating, reference 14, is a superficial film or surface coating of minimum thickness to cover and with as little penetration or impregnation as possible. With this in mind, the film of coating should be at a minimum thickness, and while roll coating might be employed, spraying has been found far more satisfactory to the end of maintaining a minimum thickness.

After the coating is applied, the coated sheet is dried, at least partially, but without curing the coating, by being passed over drying rollers. Drying before embossing reduces the degree of stiffening of the surface coating and leaves it considerably more resilient than would be the case if the wet coating were embossed and cured.

From here the coated felt sheet is passed to curing and embossing compression rollers in the form of hollow rollers having their outer surfaces provided with male protuberances to form indented patterns in the opposite faces of the travelling coated felt sheet, the indentations being shown at 29—30. The rollers are provided with internal electrical heating means, not shown, for curing the coatings on the sheet. The heating requirement of the rollers may range between 180° F. to 450° F., depending upon which type of compound is used for coating the felt sheet. Air blown through the hollow rollers will aid in the drying and curing of the coatings. Regardless of the form, apparatus should be used to effect complete curing of the coatings.

From here the coated sheet may be passed to two sets of rollers which respectively bevel and trim the edges of the coated felt sheet as shown at 32 in Fig. 3.

The sealing compound may be mixed with various types of anti-oxidants and curing ingredients and stabilizers to permit a perfect application and curing of the sealing compound with complete assurance that no oxidation or deterioration will take place after the sealing compound has been applied to the felt sheet and cured.

The coating 14 thus formed is quite resilient and rubbery and the interior of the pad, between the coatings, in the main, is free of impregnation by the coating, the degree of impregnation being only sufficient to insure bonding.

It will be observed that the center portion of the rug cushion is not at all penetrated by the coatings of sealing compound on the opposite surfaces of the rug cushion, nor is densified or cured by the compression rollers. The projections of these rollers are so designed as merely to densify and cure the outer surfaces of the rug cushion, stiffening these surfaces, but leaving the center portion of the felt sheet comparatively unchanged, and, hence, pliable in accordance with the characteristics of the felt sheet before coating.

The patterning or embossing of the rug cushion

One face of the rug cushion is shown as embossed with a waffle or checkered rib pattern which leaves continuous ribs 40—41—42—43 on that face of maximum height. Ribs 40 are parallel to the axis of the cylinder into which the rug cushion is rolled for storage and handling. Ribs 40—41—42—43 rigidify the cushion in all lateral direction. The indentations 29 are relatively deep, in a preferred embodiment being .085" deep.

The opposite face is also embossed, but the pattern of embossment is quite different, being in the form of longitudinally extending grooves 30 parallel to the axis of rolling of the rug cushion. Between these grooves are ribs 51 of maximum thickness.

Ribs 40 of one face match the ribs 51 of the other to provide sections 52 of maximum thickness. The longitudinal grooves 30 are relatively less deep than the indentations 29 of the waffle pattern, in a preferred embodiment being .035" deep.

Thus, the minimum thickness is equal to the thickness of the felt sheet minus .120", and the maximum thickness at sections 52 equal to the original thickness of the sheet.

The provision of the longitudinal grooves 30 parallel to the axis of rolling facilitates rolling of the rug cushion without buckling.

While this invention has been described in connection with certain illustrative embodiments thereof, it is to be understood that this has been done merely for exemplification and that the scope of the invention is to be limited only by the following claim.

What I claim is:

Floor covering rug cushion underlay comprising a loosely matted felted fiber cushion having a substantial thickness coated upon both upper and lower surfaces with a relatively thin dry layer of rubber latex having integrally included therein the outer fibers only of said matted cushion base, and thermally set as a continuous highly resilient integral rubber film by hot embossment into the upper and lower surfaces of said cushion, one of said embossed surfaces comprising a plurality of wide indentations, said indentations being separated from each other by unindented rigidifying ridge portions extending both laterally and longitudinally in said rug surface to define a checkered pattern, the opposite side of said rug embossment comprising a series of longitudinal ribs separated by narrow longitudinal indentations, said longitudinal ribs being laterally spaced to provide a longitudinal rib to directly reinforce, vertically support and longitudinally coincide with each longitudinal rib on the opposite face.

JACK C. GORDON.

REFERENCES CITED

The following references are of record in the file of this patent:

UNITED STATES PATENTS

| Number | Name | Date |
| --- | --- | --- |
| 1,930,217 | Weindel | Oct. 10, 1933 |
| 2,032,114 | Clemens | Feb. 25, 1936 |
| 2,111,933 | King | Mar. 22, 1938 |
| 2,121,709 | Moriarty | June 21, 1938 |
| 2,187,140 | Faris et al. | Jan. 16, 1940 |
| 2,198,724 | Schreiner | Apr. 30, 1940 |
| 2,314,162 | Reinhardt | Mar. 16, 1943 |
| 2,541,868 | Gordon | Feb. 13, 1951 |

FOREIGN PATENTS

| Number | Country | Date |
| --- | --- | --- |
| 330,456 | Great Britain | June 12, 1930 |